US009756478B2

(12) United States Patent
Shafi et al.

(10) Patent No.: US 9,756,478 B2
(45) Date of Patent: Sep. 5, 2017

(54) IDENTIFICATION OF SIMILAR USERS

(71) Applicant: Google Inc., Mountain View, CA (US)

(72) Inventors: Sayed Yusef Shafi, San Francisco, CA (US); Todd Hester, San Francisco, CA (US); Jonathan Ben-Meshulam, Mountain View, CA (US); Sourav Raj Dey, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/978,841

(22) Filed: Dec. 22, 2015

(65) Prior Publication Data

US 2017/0180947 A1 Jun. 22, 2017

(51) Int. Cl.
| | |
|---|---|
| *H04W 4/04* | (2009.01) |
| *H04W 4/08* | (2009.01) |
| *G06N 7/00* | (2006.01) |
| *H04L 12/26* | (2006.01) |
| *G06N 99/00* | (2010.01) |

(52) U.S. Cl.
CPC .............. *H04W 4/04* (2013.01); *G06N 7/005* (2013.01); *G06N 99/005* (2013.01); *H04L 43/045* (2013.01); *H04L 43/16* (2013.01); *H04W 4/08* (2013.01)

(58) Field of Classification Search
CPC .......... H04W 4/04; H04W 4/08; G06N 7/005; G06N 99/005; H04L 43/045
See application file for complete search history.

(56) References Cited

U.S. PATENT DOCUMENTS

| | | | |
|---|---|---|---|
| 6,435,417 B1 | 8/2002 | Holdgrewe et al. | |
| 8,577,505 B2 | 11/2013 | Foslien et al. | |
| 8,577,711 B2 | 11/2013 | Korecki et al. | |
| 8,600,562 B2* | 12/2013 | Oswald .................. | G05B 15/02 340/662 |
| 9,053,438 B2 | 6/2015 | Marwah et al. | |
| 2003/0120630 A1 | 6/2003 | Tunkelang et al. | |
| 2010/0025483 A1 | 2/2010 | Hoeynck et al. | |
| 2011/0314320 A1* | 12/2011 | Chang ................. | F24D 19/1048 713/340 |
| 2012/0310376 A1* | 12/2012 | Krumm .................. | G05B 15/02 700/31 |
| 2013/0274928 A1 | 10/2013 | Matsuoka et al. | |
| 2014/0129160 A1* | 5/2014 | Tran ......................... | H02J 3/14 702/61 |
| 2015/0032277 A1* | 1/2015 | Warren .................. | G05B 15/02 700/291 |
| 2015/0088272 A1* | 3/2015 | Drew ...................... | H04L 67/10 700/12 |
| 2015/0211761 A1 | 7/2015 | Copley et al. | |
| 2016/0148099 A1* | 5/2016 | Micali ...................... | G06N 5/04 706/11 |

\* cited by examiner

*Primary Examiner* — Brandon Miller
(74) *Attorney, Agent, or Firm* — Morris & Kamlay LLP

(57) ABSTRACT

A peer group of a user may be identified on the basis of geographic information and building occupancy information for the user and for possible peers of the user. Energy usage data for each peer group member may be compared with that of the user. A comparison result may be computed between each peer group member and the user. A representation of comparison results may be provided to the user.

16 Claims, 10 Drawing Sheets

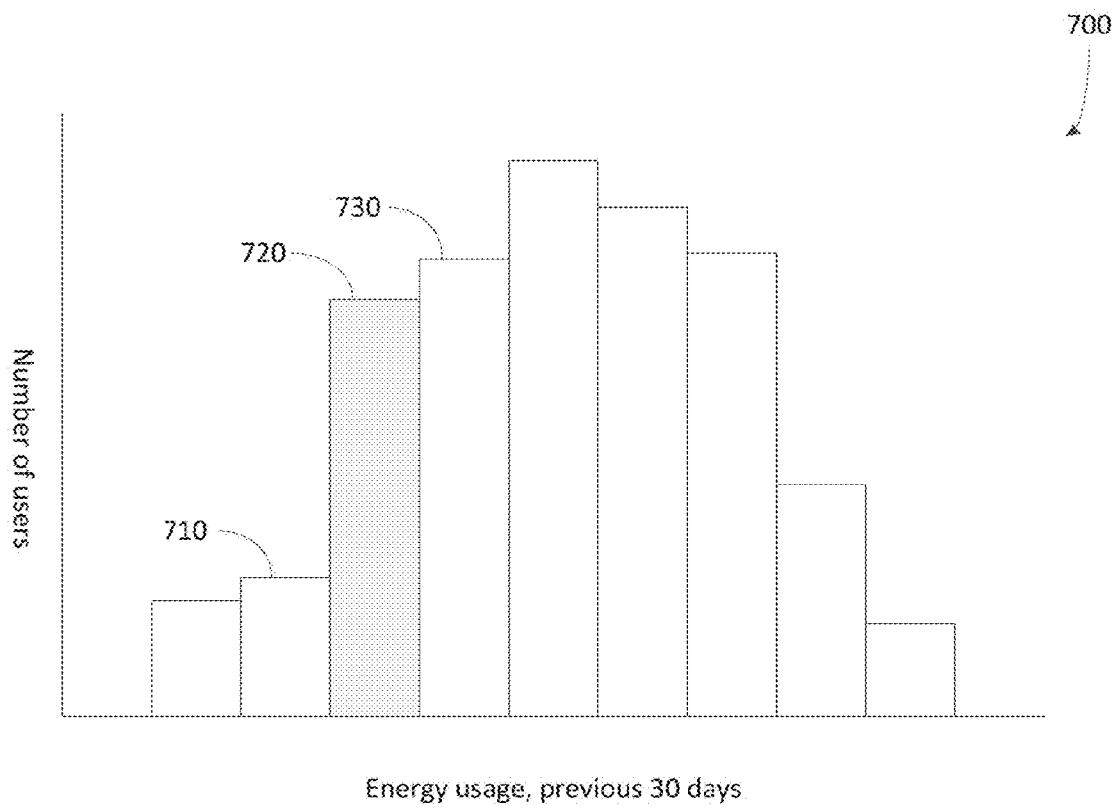
FIG. 7a
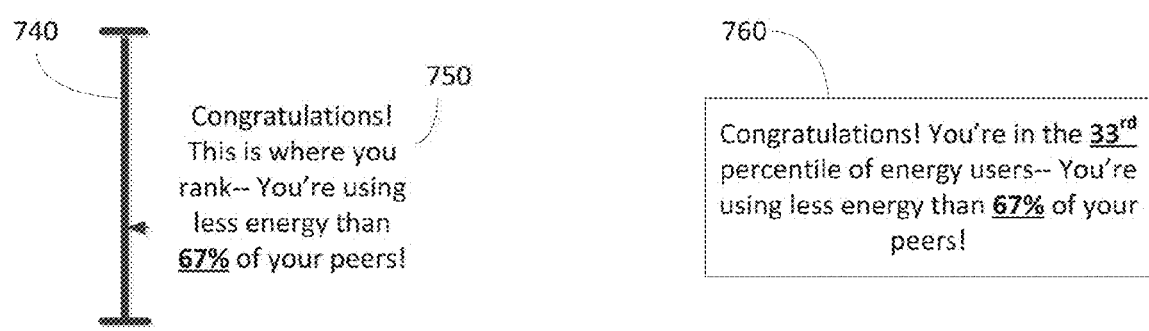
FIG. 7b
FIG. 7c

IDENTIFICATION OF SIMILAR USERS

BACKGROUND

It can be useful for a person to know how he or she compares to others in a variety of respects. For example, a user may be conscious of the need to conserve energy in the operation of his home. He may want to know whether his home energy usage is greater or less than that of other homeowners.

Continuing this example, if the user lives in the mid-Atlantic region of the United States, e.g., in Pennsylvania, it may not be useful to compare his energy usage to that of a homeowner in a different location, such as North Carolina or Minnesota. During the winter months, for example, a homeowner in North Carolina may have limited energy consumption for heating purposes; meanwhile a homeowner in Minnesota would normally consume a significant amount of energy to heat his home during the winter, perhaps more so than the user in Pennsylvania. The user's energy needs, therefore, may not be comparable to the energy needs of homeowners living in other locales. Even within the state of Pennsylvania, climates may differ significantly. Some live in mountainous areas, others live in the Great Lakes region, and others live in the heat island of Philadelphia. It would therefore be of limited value for the user to compare his energy usage to someone living in a different geographic region, whether these different geographic regions are defined by location or climate.

Moreover, other homeowners may use their homes in a different manner than the user. Some homeowners may work at home, so that the house is occupied almost all of the time, requiring heating throughout the day during the winter. Other homeowners work during outside the home, perhaps leaving the house at 7:30 AM to go to work and returning at 6:00 PM. In the latter case, the homeowner's energy requirements would be limited during this time.

Therefore, it is not necessarily useful for a user to compare his energy usage to that of another random user. This could lead to invalid and misleading comparisons. It would be more useful for the user to compare his energy usage to others that are similarly situated, geographically and otherwise. Moreover, this may also be true for statistics aside from energy usage. A user may be interested in how he compares to others in other respects, such as internet usage, healthcare costs, or income level. For all such inquiries a user would generally need to compare himself to similarly situated peers in order to generate meaningful comparisons.

BRIEF SUMMARY

According to an embodiment of the disclosed subject matter, in a computer-implemented method a peer group of a user may be identified on the basis of geographic information and building occupancy information for the user and for possible peers of the user. Once a peer group is identified, energy usage data for each peer group member may be compared with that of the user. A comparison result may be computed between each peer group member and the user. A representation of comparison results may then be provided to the user.

In an embodiment of the disclosed subject matter, a system comprises a programmable processor, and a memory in communication with the processor where the memory stores instructions. Such instructions, when executed by the processor, may cause the processor to identify a peer group of a user on the basis of geographic information and building occupancy information for the user and for possible peers of the user. The instructions may further cause the processor to compare energy usage data for each peer group member with energy usage data for the user and to compute a comparison result between each peer group member and the user. The instructions may also cause the processor to provide a representation of comparison results to the user.

The geographic information may comprise location information and climate information. The building occupancy information may comprise the likelihood that a person is present in a building at each of a plurality of time intervals during a day. The geographic information and building occupancy information may be formatted as one or more feature vectors.

The identification of the peer group may comprise comparing of feature vectors of each possible peer with feature vectors for the user, wherein the comparison of the feature vectors may comprise computing a geographic distance $d_g$ between the user and the possible peer; computing an occupancy distance $d_o$ between the user and the possible peer; and computing an overall distance d between the user and the possible peer, where d is a function of $d_g$ and $d_o$.

In an implementation, the geographic distance $d_g$ may be computed as $$d_g(x,y) = \text{haversine}(x_1,y_1) + \alpha\|x_c - y_c\| \text{ for the user } x \text{ and a possible peer } y,$$

where $x_1$ and $y_1$ represent locations of the user x and a possible peer y respectively, $x_c$ and $y_c$ are feature vectors representing climate information for the user and the peer group member respectively, $\alpha$ is a climate information weighting factor, and $\|\ \|$ is a norm calculation. The occupancy distance $d_o$ may be computed as $$d_o(x,y) = \langle x_o, y_o \rangle / \|x_o\|^2 \|y_o\|^2,$$

where $x_o$ and $y_o$ are feature vectors representing the likelihood of occupancy in each of several time intervals by the user x in a building associated with user x, and by a possible peer y in a building associated with possible peer y, respectively, and $\langle\ \rangle$ is a dot product calculation. The overall distance d may be computed as $$d(x,y) = d_g + \beta d_o,$$

where $\beta$ is an occupancy distance weighting factor.

The peer group may comprise possible peers whose respective overall distances from the user are less than a predefined threshold distance. The peer group may comprise a predefined number of possible peers having the shortest overall distances from the user, of the possible peers.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 shows user devices in communication with a centralized computing device according to an embodiment of the disclosed subject matter.

FIG. 7a-7c are indicators that may be provided to the user, comparing his energy usage to that of peers, according to an embodiment of the disclosed subject matter.

DETAILED DESCRIPTION

In systems and methods described below, a peer group of a user may be identified on the basis of geographic information and building occupancy information for the user and for possible peers of the user. Energy usage data for each peer group member may be compared with that of the user. A comparison result may be computed between each peer group member and the user. A representation of comparison results may be provided to the user.

Figure 1:
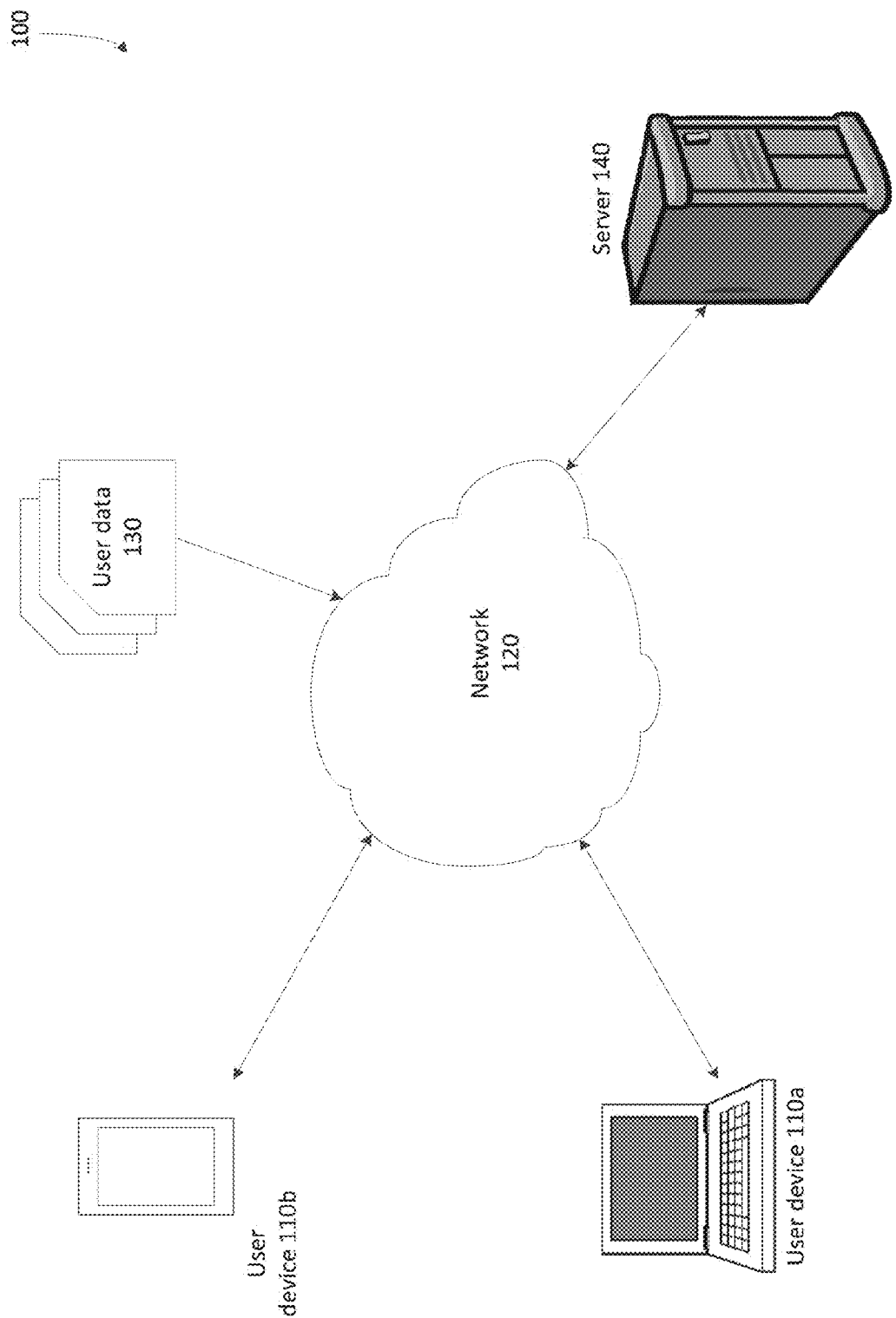

FIG. 1 illustrates a system 100 embodying the technology described herein. A central computing device, such as a controller or server 140, may be configured to identify a peer group of a user. As will be described in greater detail below, possible peers may be considered by comparing them each to the user. This may require the server 140 to access data 130 related to the user and to possible peers. Those possible peers that are sufficiently similar to the user according to a distance metric may be considered as the peer group of the user. Members of the peer group may then be compared to the user with respect to some statistic of interest, such as home energy consumption. In other embodiments, the peer group may be compared to the user with respect to some other statistic, e.g., internet usage or income level. The comparison may be performed by the server 140. The results of the comparison may then be presented to the user through a device accessible by the user, such as user device 110a (e.g., a personal computer) or user device 110b (e.g., a smart phone).

In the illustrated embodiment, the server 140 may access the user data 130 through a network 120 and may communicate with the user device(s) 110a and/or 110b through this network. The network 120 may be a local area network, a wide area network, an internet, or any combination thereof.

Further, the processing attributed to the server 140 above may instead be performed locally at one of the user devices in a different implementation. In addition, while the user data 130 is shown as being separate from any of the other illustrated components, the user data 130 may alternatively be stored locally at the server 140 and/or at one of the user devices.

Figure 11:
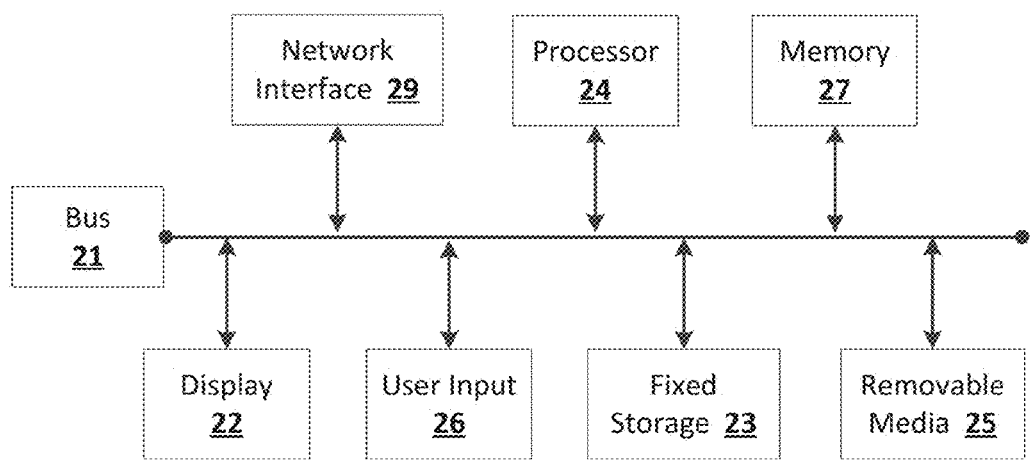
FIG. 11 illustrates a computing device, according to an embodiment of the disclosed subject matter.

Devices 110a, 110b, and 140 are illustrated in greater detail in FIG. 11 and described below.

Figure 2:
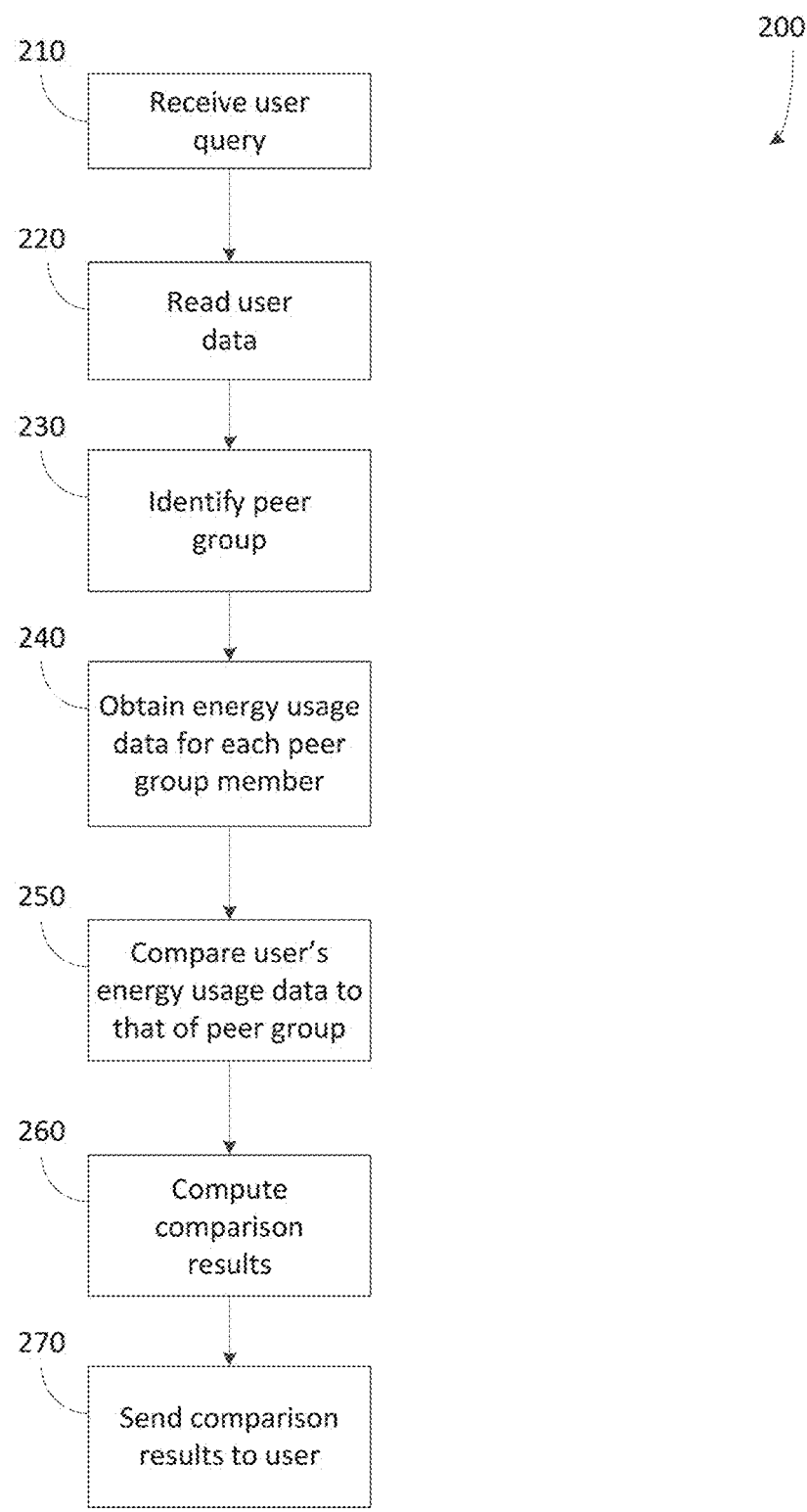
FIG. 2 is a flowchart illustrating the processing of an embodiment of the disclosed subject matter.

FIG. 2 illustrates the processing of the system described herein, according to an embodiment. At 210, a user query may be received. Such a query from a user may be seeking a comparison of the user to his peers with respect to some statistic. In this illustration, the statistic of interest is energy consumption at the user's home over a defined period of time. As noted above, other statistics and comparisons may be queried in other embodiments. In this embodiment, further processing is performed once the user query is received at 210. At 220, data related to the user may be read. This data may include attributes of the user, such a location of the user's home, climate information related to the location, and occupancy information of the home. The user data may also include information related to energy consumption at the user's home.

At 230, a peer group for the user may be identified. Such a group may include other persons who are similarly situated to the user. As will be described in greater detail below, the identification of the peer group may be based on geographic considerations and on occupancy tendencies of potential peer group members at their respective homes. At 240, energy usage data may be obtained for some or all members of the peer group. At 250, the user's energy usage is compared to that of peer group members. At 260, comparison results are computed. In an embodiment, the comparison may include a determination of how the user's energy consumption ranks with that of peer members. At 270, the comparison results may be sent to the user. In an embodiment, the results may be presented to the user in a graphical form. Alternatively or in addition, the comparison results may be presented to the user in textual form or in audible form.

Figure 3:
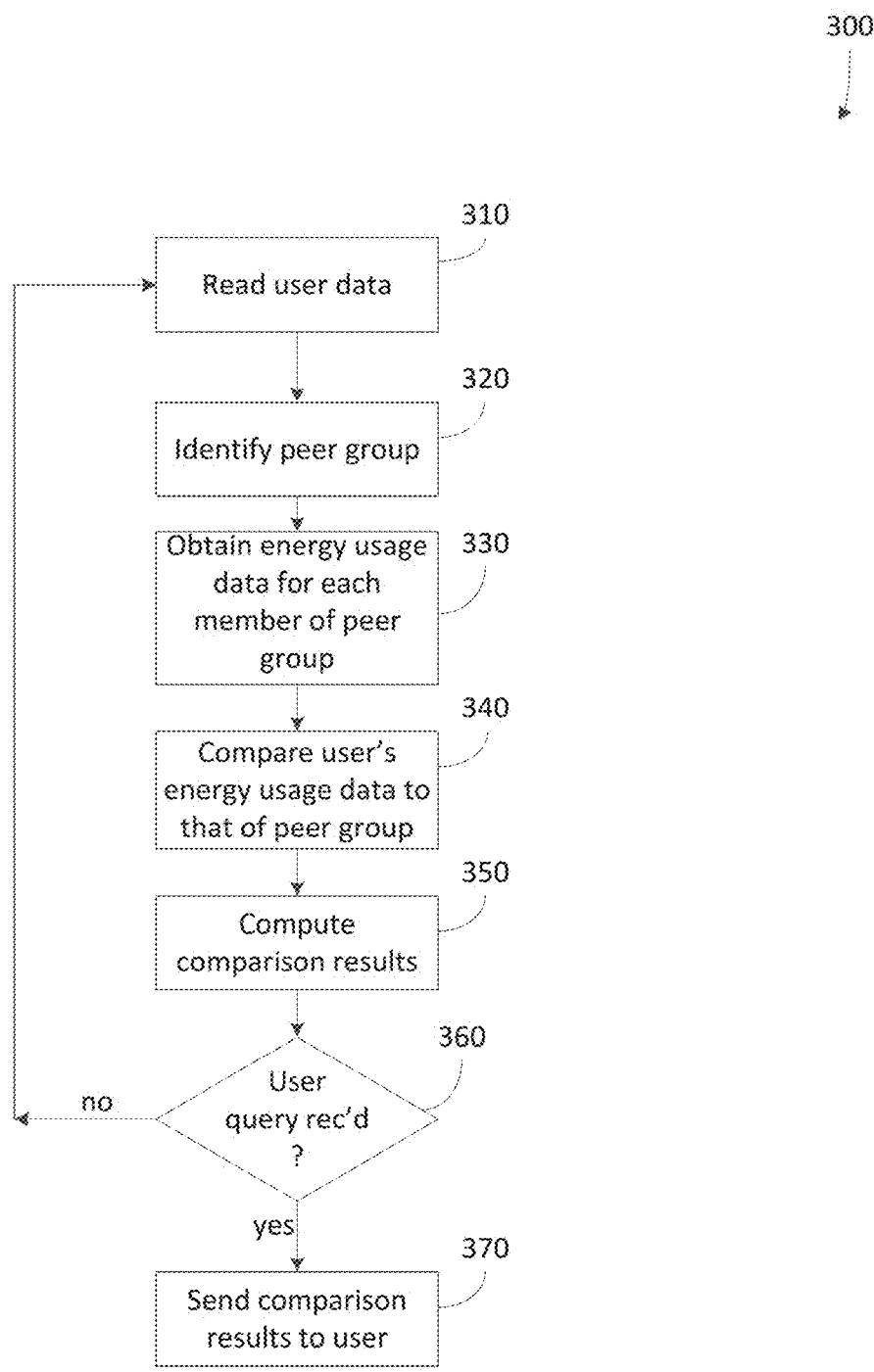
FIG. 3 is a flowchart illustrating the processing of an embodiment of the disclosed subject matter.

FIG. 3 illustrates the processing of the system described herein, according to another embodiment. In this embodiment, the processing may be essentially continual and reiterative, and results may be presented to the user when a user query is received. This allows for continual re-definition of the peer group and updating of comparison results, so that current results are provided to the user.

At 310, data related to the user may be read. This data may include attributes of the user, such a location of the user's home, climate information related to the location, and occupancy information of the home. The user data may also include information related to energy consumption at the user's home. At 320, a peer group for the user may be identified. Such a group may include other persons who are similarly situated to the user. As will be described in greater detail below, the identification of the peer group may be based on geographic considerations and on occupancy tendencies of possible peer group members at their respective homes. At 330, energy usage data may be obtained for some or all members of the peer group. At 340, the user's energy usage is compared to that of peer group members. At 350, comparison results are computed. In an embodiment, the comparison may include a determination of how the user's energy consumption ranks with that of peer members.

At 360, a determination is made as to whether a user query has been received. Such a query from a user may be seeking a comparison of the user to his peers with respect to some statistic. In the illustrated embodiment, the statistic is energy consumption at the user's home over a defined period of time. As noted above, other statistics and comparisons may be queried in other embodiments. If a query has been received, then at 370, the comparison results may be sent to the user. In an embodiment, the results may be presented to the user in a graphical form. Alternatively or in addition, the comparison results may be presented to the user in textual form or in audible form. If it is determined at 360 that a query has not been received, then processing may resume at 310.

While the processing described above relates to energy consumption in a user's home, it is to be understood that this disclosure may also be applicable to energy consumption at a different structure, such a user's school or office for example. Moreover, analogous processing may be performed for purposes of determining other statistics related to the user and a peer group.

Figure 4:
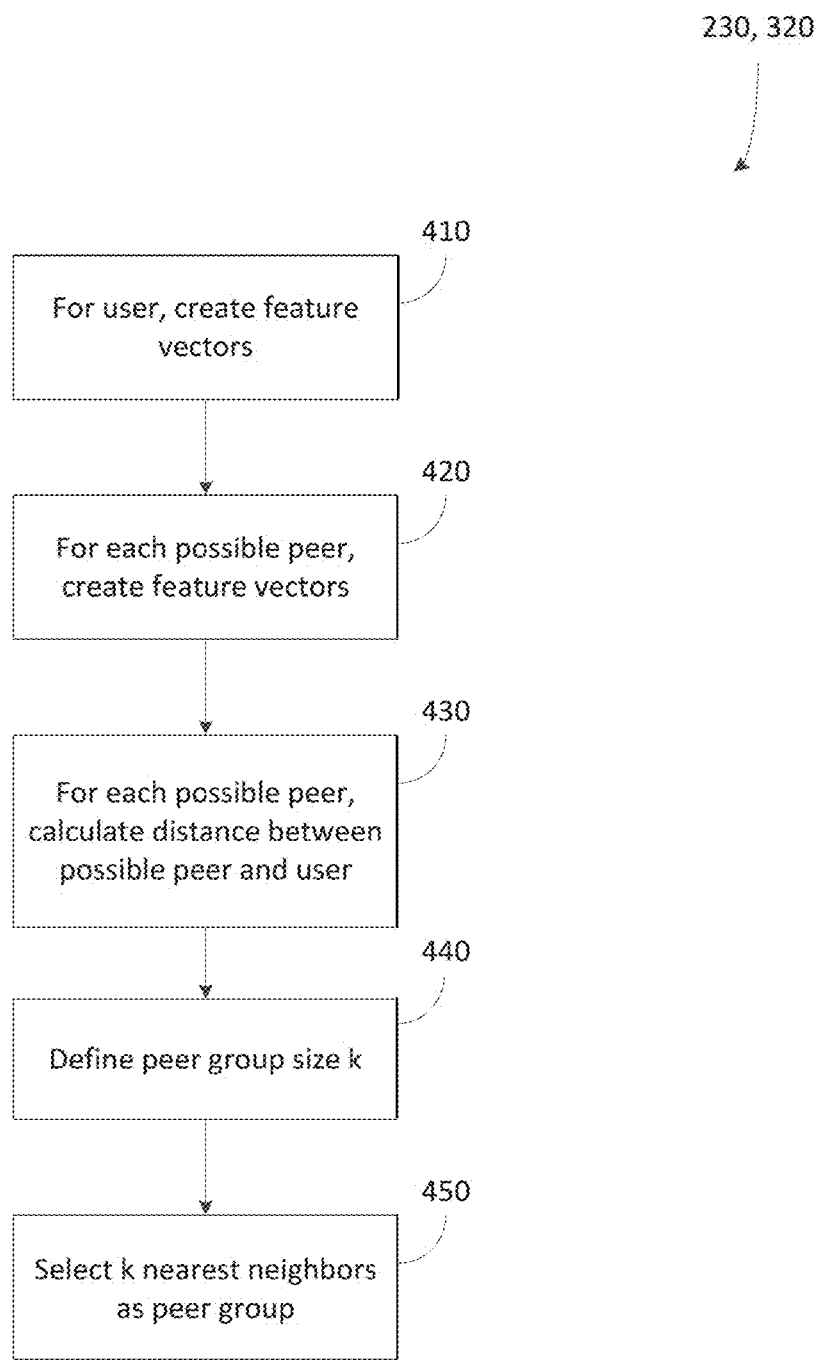
FIG. 4 is a flowchart illustrating the identification of a peer group, according to an embodiment of the disclosed subject matter.

FIG. 4 illustrates the identification of a peer group, according to an embodiment. At 410, information related to the user may be encoded in one or more feature vectors. For example, a vector may be created that encodes geographical information about the user, to include location data (e.g., latitude and longitude) and historical climate data at the location of the user's home. The climate data may include, for example, statistics related to winter and summer temperatures. The climate data may include the first percentile winter temperature value, for example (i.e., the winter temperature that is lower than 99% of the winter temperatures for the most recent year and higher than 1% of these temperatures). The climate data may also include the 99th percentile summer temperature value, for example (i.e., the summer temperature that is lower than 1% of the summer temperatures for the most recent year and higher than 99% of these temperatures). Alternatively or in addition, the climate data may include data related to multiple previous years, seasonal median or mean temperatures, information on wind, and/or precipitation information.

A feature vector that encodes occupancy information may also be created for the user. For example, each component of such a feature vector may represent a likelihood that the user is present in his house at some point in a particular interval of time. The first component of the vector may represent the probability that the user is at home between 12:00 AM and 12:10 AM; the next component may represent the probability that the user is at home between 12:10 AM and 12:20 AM; etc. In this example, there would be 144 time intervals considered (representing each of six intervals per hour, over a 24 hour day), and 144 corresponding components in this feature vector. In another embodiment, the time intervals are five minutes long, so that there would be 288 time intervals considered. The likelihood of occupancy in any given interval may be based on historical data. Whether the user is at home at any particular time may be determined in any of several ways, as will be described below.

At 420, analogous feature vectors may be created for each possible peer. At 430, for each possible peer, a distance metric may be calculated between the peer and the user. The distance metric represents a difference between the peer and the user, based on the differences between respective feature vectors. Such a calculation is described below. At 440, a desired size for the peer group is determined. The number of members in the peer group is shown as k. At 450, the k peers whose distances from the user are the smallest are selected as the peer group. These peers represent the k "nearest neighbors" (KNN) to the user.

Figure 5:
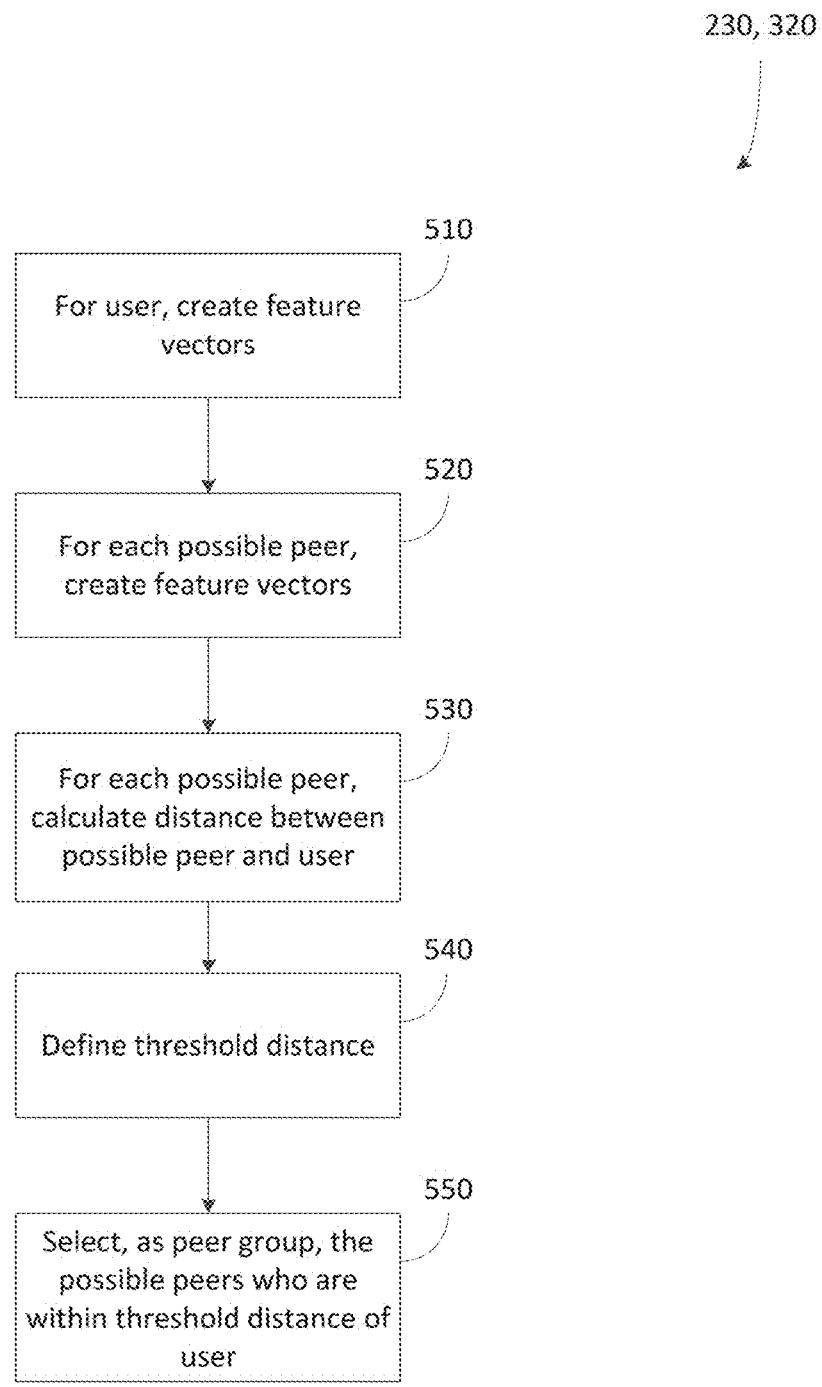
FIG. 5 is a flowchart illustrating the identification of a peer group, according to an embodiment of the disclosed subject matter.

Another embodiment of a peer group identification process is shown in FIG. 5. At 510, feature vectors for the user may be created in the manner described above with respect to FIG. 4, for example. At 520, feature vectors may be created for each possible peer. Again, this may be performed in a manner similar to that described above. At 530, a distance metric may be calculated between each possible peer and the user. At 540, a threshold distance may be defined. At 550, a peer group may be selected where the members are those whose respective distances from the user are less than the threshold distance. Such a peer group therefore includes those people within a threshold distance or statistical "neighborhood."

The calculation of a distance between a peer and the user may be done in any of several ways. Let the location of a user x be represented as a feature vector $x_1$ (e.g., having as its components latitude and longitude) and let the location of a peer y be an analogous feature vector $y_1$. Let $x_o$ and $y_o$ be feature vectors representing the likelihood of occupancy in each of several time intervals by the user x in a building (e.g., a home) associated with user x, and by a peer group member y in a building associated with peer group member y, respectively. In an embodiment, a Euclidean distance function d between user x and peer y may be calculated as $$d(x,y)=\|x-y\|^2=\|x_1-y_1\|^2+\|x_o-y_o\|^2.$$

Figure 6:
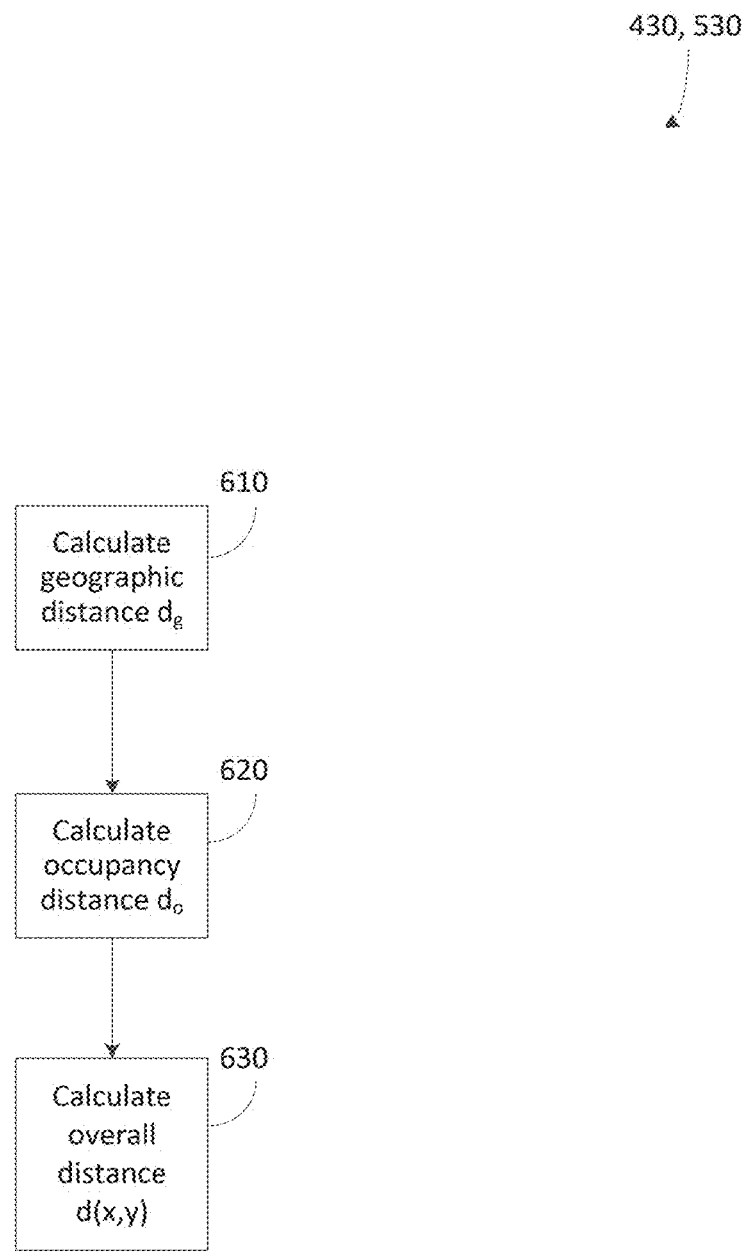
FIG. 6 is a flowchart illustrating the calculation of an overall distance between a user and a possible peer, according to an embodiment of the disclosed subject matter.

Another embodiment is illustrated in FIG. 6, according to an embodiment. Here, the distance d(x,y) between two parties (the user x and a peer y) may include a calculation of a geographic distance $d_g$ and calculation of an occupancy distance $d_o$. At 610, the geographic distance $d_g$ may be calculated. In an embodiment, this value may be calculated as $$d_g=d_g(x,y)=\text{haversine}(x_1,y_1)+\alpha\|x_c-y_c\|$$

for the user x and peer group member y, where $x_1$ and $y_1$ represent locations of the user x and peer group member y respectively, $x_c$ and $y_c$ are feature vectors representing climate information for the user and the peer group member respectively, $\|\ \|$ is a norm calculation, and $\alpha$ may be a scalar value acting as a climate information weighting factor. In an embodiment, the climate distance that is multiplied by $\alpha$ may be a Mahalanobis distance. The haversine function refers to the great circle distance.

At 620, an occupancy distance $d_o$ is calculated. In an embodiment, this value may be calculated as $$d_o=d_o(x,y)=\langle x_o,y_o\rangle/\|x_o\|^2\|y_o\|^2$$

for the user x and the peer group member y, where $x_o$ and $y_o$ are feature vectors representing the likelihood of occupancy in each of several time intervals by the user x in a building associated with user x, and by a peer group member y in a building associated with peer group member y, respectively. In an embodiment, these buildings may be the homes of x and y, respectively. The notation $\|\ \|$ represents a norm calculation, and $\langle\ \rangle$ is a dot product calculation.

The values of vectors $y_o$ and/or $y_c$ may be determined using a plurality of sensors or other devices to determine occupancy and other information for possible peers. The collection of such information may therefore be the result of aggregation of multiple information items, collected using multiple devices, multiple types of devices, and multiple modalities.

At 630, the overall distance calculation may be performed between the user x and the peer y, $$d(x,y)=d_g+\beta d_o.$$

Here $\beta$ may be a scalar value acting as an occupancy information weighting factor.

Several of the parameters described above may be adjustable. These parameters may include, for example, the number k of nearest neighbors, the threshold distance referenced at 540 of FIG. 5, and/or the above weighting factors $\alpha$ and $\beta$. In an embodiment, some or all of these parameters may be defined during system configuration, and/or may be changed by a system administrator. Moreover, some or all of these parameters may be adjusted by the user. The administrator or user may wish to consider a larger or smaller peer group for example, and may therefore choose a different value of k, or a different distance threshold. He may wish to adjust the impact of climate in determining geographic distance, by adjusting $\alpha$; he may wish to adjust the impact of occupancy in the overall distance calculation, by adjusting $\beta$.

The processing described above with respect to FIGS. 2-6 may be implemented in hardware, firmware, or software, or any combination thereof. In an embodiment, this processing may be performed by a programmable computing device such as server 140 discussed above with respect to FIG. 1. Alternatively, this processing may be performed at one of the user devices 110. Alternatively, various portions of this processing may be allocated to two or more of the devices shown.

When the user's home energy usage is compared to that of his peers, the comparison results may be presented to the user in a graphical form. One example of such a presentation is illustrated in FIG. 7a. Graph 700 is a bar graph or histogram. The x-axis represents energy usage over the past 30 days, and the y-axis represents the number of users. Each bar represents a set of peers, where the size of the set is represented as the height of the bar. The placement of the bar on the x-axis corresponds to the energy usage of the peers represented by the bar. The number of peers in group 730 is larger than that of group 720 (as indicated by the heights of their bars) and the peers in group 730 each use less energy at home than the peers in group 720. Similarly, the number of people in group 720 is larger than that of group 710 (as indicated by the heights of their bars) and the peers in group 720 each use less energy at home than the peers in group 710. In this illustration, the set of peers to which the user belongs, as determined by home energy usage, is shaded. The user can therefore see at a glance how he compares to peers with respect to energy usage.

Such information may be displayed in other ways as well, and/or may be displayed as text and/or graphics. In the example of FIG. 7b for example, the user's energy usage is shown as a point on a scale, showing where the user ranks in comparison to his peers. Words 750 may also be included to explain his ranking and to provide encouragement. In the example of FIG. 7c, the user is shown a text message 760 that tells him where he ranks in relation to his peers, without using any other graphics. In an alternative embodiment, this information may be presented audibly instead of (or in addition to) a visual presentation. It is to be understood that such outputs as described here are presented as examples, and are not meant to be limiting.

Figure 8:
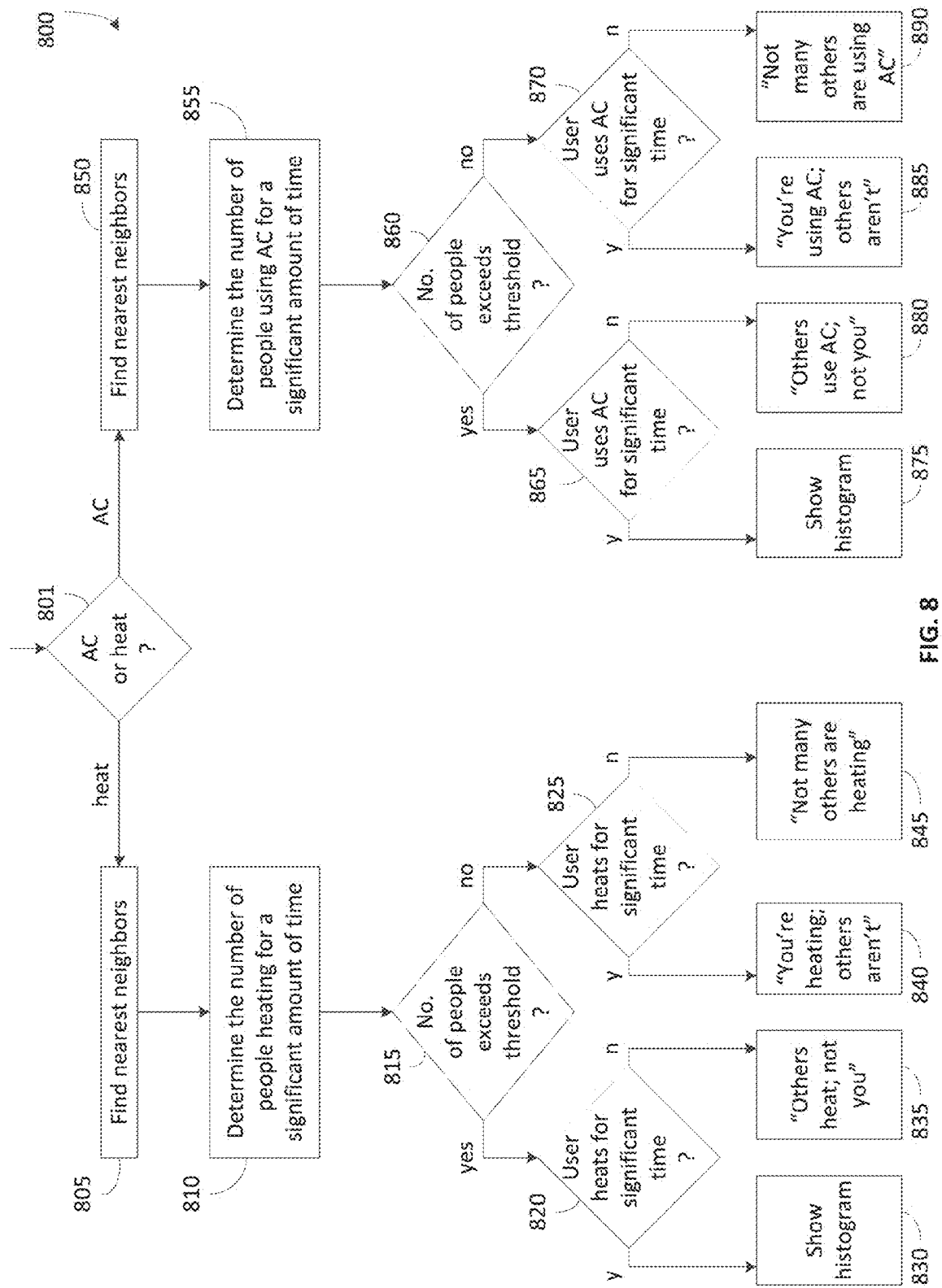
FIG. 8 is a flowchart illustrating how the indicators of FIGS. 7a-7c may be determined, according to an embodiment of the disclosed subject matter.

In an embodiment, presentations such as those shown in FIG. 7a-7c may not always be shown to a user; in some situations, such a statistical graphic may not be necessary. Alternative outputs to a user are shown in FIG. 8, along with the processing that may be used in determining what which output to present.

In this embodiment, the appropriate output depends in part on whether heating or air conditioning (AC) is of interest. This is shown at 801. If the ultimate output to the user will relate to energy consumption in the heating of a user's home, for example, then at 805, the user's peer group (i.e., set of nearest neighbors) is determined. The peer group may be determined in the manner described above, for example. At 810, the number of people in the peer group who are using heating for a significant period of time is determined. In an embodiment, this may be determined with respect to a predetermined threshold amount of time during which heating is taking place. This number of people may represent those peers who are running their furnaces beyond a threshold amount of time in the past 30 days, for example. At 815, it may be determined whether this number of peers exceeds a threshold number. If so, then at 820 a determination is made as to whether the user has been using heating for more than the predetermined threshold amount of time. If so, at 830 the user may be shown a histogram such as that of FIG. 7 for example. If the user is determined at 820 not to be using heating for the threshold amount of time, then he is not using heating to the same extent as a significant number of his peers, and a message such as that shown at 835 ("Others heat; not you") may be enough to describe the relative extent of his heating use.

If, at 815, the number of peers using heating for the threshold amount of time does not exceed the threshold number, then at 825, a determination is made as to whether the user has been using heating for more than the predetermined threshold amount of time. If so, then this is stated to the user with the message of 840 ("You're heating; others aren't"). If the user has not been using heating for more than threshold amount of time as determined at 825, then the message of 845 ("Not many others are heating") may be shown to the user.

Analogous processing may be performed in the case of air conditioning. At 850, the user's peer group (i.e., his set of nearest neighbors) is determined. The peer group may be determined in the manner described above, for example. At 855, the number of people in the peer group who are using AC for a significant period of time is determined. In an embodiment, this may be determined with respect to a predetermined threshold amount of AC use, measured by time. This number may represent those peers who are running their AC units beyond a threshold amount of time in the past 30 days, for example. At 860, it may be determined whether this number of peers exceeds a threshold number. If so, then at 865 a determination is made as to whether the user has been using AC for more than the threshold amount of time. If so, then at 875 the user may be shown a histogram analogous to that of FIG. 7, for example. If the user is determined at 865 not to be using AC for the threshold amount of time, then he is not using AC to the same extent as a significant number of his peers, and a message such as that shown at 880 ("Others use AC; not you") may be enough to describe the relative extent of his heating use.

If, at 860, the number of peers using AC for the threshold amount of time does not exceed the threshold number, then at 870, a determination is made as to whether the user has been using AC for more than the threshold amount of time. If so, then this is stated to the user with the message of 885 ("You're using AC; others aren't"). If the user has not been using heating for more than threshold amount of time as determined at 870, then the message of 890 ("Not many others are using AC") may be shown to the user.

While the indicated outputs to the user (830-845 and 875-890) describe how the user compares to others, in an embodiment the process may also output messages (not shown) that encourage particular behavior, e.g., energy conservation. Outputs 830 and 840, for example, may also include suggestions to lower the user's thermostat settings or otherwise use less heating. Outputs 875 and 885 may include suggestions to raise a thermostat setting or otherwise use less AC.

The occupancy data used to identify peers may be determined in any of several ways. In an embodiment, the location of a user may be determined by monitoring the location of the user. This may be accomplished by monitoring the location of a personal electronic device of the user, such as a smartphone, where the location may be determined by logic in the smartphone. If the personal electronic device is located in the user's home at a particular time, for example, it could be presumed that the user is present. Data may then be collected throughout a day, either continually or by sampling, to determine the likelihood that a user is present in any given time interval. Such location monitoring may be contingent on the consent of the user. If there is more than one occupant in the home, the locations of the personal electronic devices of any or all of the other occupants may be similarly determined. Generally, for purposes of the present disclosure, a home may be considered occupied if there is at least one person present.

In situations in which the systems referenced here collect personal information about users, or may make use of personal information, the users may be provided with an opportunity to control whether programs or features therein collect user information (e.g., information about a user's activities, preferences, or current location). Such information collection could be contingent on the user's consent. In addition, certain data may be treated in one or more ways before it is stored or used, so that personally identifiable information is removed. For example, specific information about a person's residence may be treated so that no personally identifiable information can be determined for the person, or a person's geographic location may be generalized (such as to a city or ZIP code), so that a particular location of a person cannot be determined. As another example, systems disclosed herein may allow a person to restrict the information collected by those systems to applications specific to the person, such as by disabling or limiting the extent to which such information is aggregated or used in analysis with other information from other persons. Thus, a person may have control over how information is collected about the person and used by a system as disclosed herein.

Alternatively, occupancy may be determined by one or more sensors in the home. Such sensors may detect evidence of occupancy, such as motion, sound, radiation given off by an occupant, or indications of the use of appliances or other devices in the home. Occupancy data may therefore be the result of multi-modal collection of multiple kinds of information from multiple devices and types of devices and sensors.

Generally, data generated by one or more sensors may indicate patterns in the behavior of one or more users (e.g., occupancy) and/or an environment state over time, and thus may be used to "learn" such characteristics. For example, data generated by an ambient light sensor in a room of a house and the time of day of the data generation may be stored in a local or remote storage medium with the permission of a user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupant's patterns of turning on and off lights, and may generate a response to the learned behavior. In an embodiment, the response may be to record the times during which the home appears to be occupied, as determined by light usage. In some embodiments, such behavior patterns may be verified using other sensors, such as one or more passive infrared (PIR) sensors. Continuing the example, user behavior (including occupancy) may be determined, verified, and/or further refined based upon states of, or data gathered by, one or more smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller may be a node in a home automation network, such that the controller collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented in a cloud-based system that communicates with multiple sensors, which may be located at multiple locations and may be local or remote with respect to one another.

Figure 9:
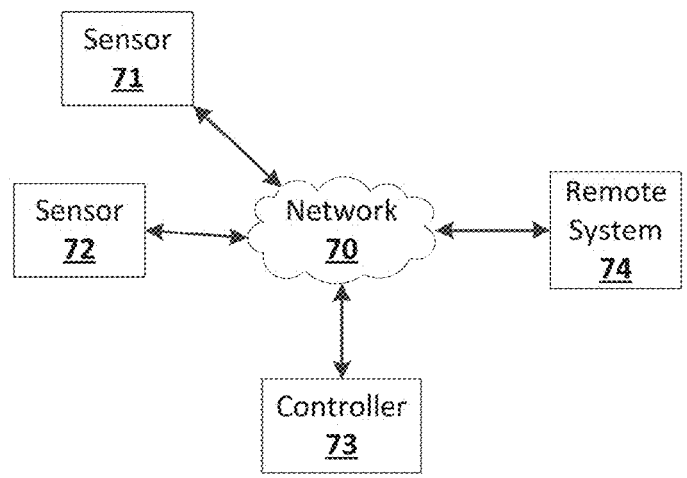
FIG. 9 illustrates the networking of sensors, a controller, and a remote system, according to an embodiment of the disclosed subject matter.

FIG. 9 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 9 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space. In an embodiment, there may be a sensor in each of several locations in a home, so that a user's presence anywhere in the home may be detected to determine occupancy.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The physical structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 9 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 9.

In some embodiments, the smart-home environment of the sensor network shown in FIG. 9 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 9. A smart wall switch may detect ambient lighting conditions (and thus detect occupancy), and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 71, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may control supply of power to a lamp (not shown).

In embodiments of the disclosed subject matter, a smart-home environment may include one or more intelligent, multi-sensing, network-connected entry detectors (e.g., "smart entry detectors") that may also be used to determine occupancy. Such detectors may be or include one or more of the sensors 71, 72 shown in FIG. 9. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 9 can include one or more intelligent, multi-sensing, network-connected doorknobs (e.g., "smart doorknob"). For example, the sensors 71, 72 may be coupled to a doorknob of a door (e.g., doorknobs located on external doors of the structure of the smart-home environment). However, it should be appreciated that smart doorknobs can be provided on external and/or internal doors of the smart-home environment. The detected use of a doorknob may be used to determine whether a home is occupied.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 9 can be communicatively coupled to each other via the network 70, and to the controller 73 and/or remote system 74 to provide security, safety, and/or comfort for the smart home environment).

Figure 10:
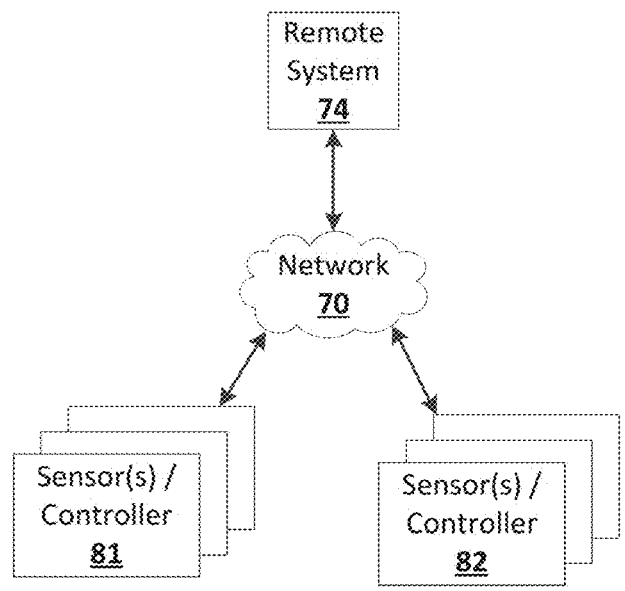
FIG. 10 illustrates the networking of sensors, a controller, and a remote system, according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as illustrated in FIG. 10 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82. In an embodiment, remote system 74 may be used to collect data regarding users' occupancy in order to identify a peer group and/or to collect peers' energy consumption data in order to generate comparison results for the user with respect to the peer group.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Embodiments of the presently disclosed subject matter may be implemented in and used with a variety of computing devices. FIG. 11 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like (e.g., user devices 110a and 110b or server 140, shown in FIG. 1). The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Figure 12:
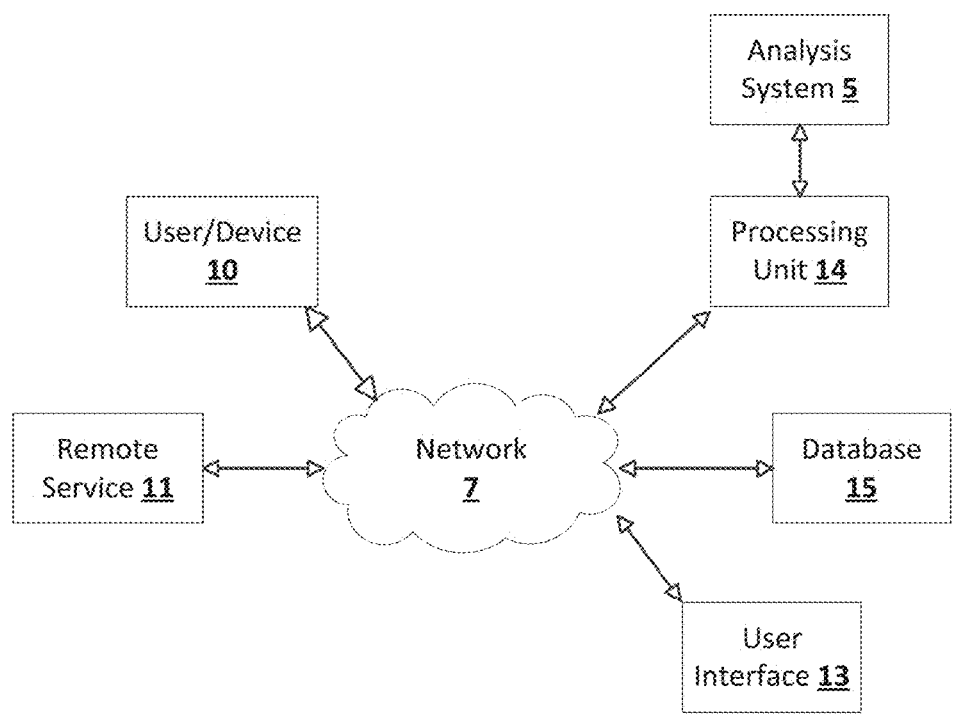
FIG. 12 illustrates the networking of a user device with other components, according to an embodiment of the disclosed subject matter.

FIG. 12 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   identifying a peer group of a user on the basis of geographic information and building occupancy information for the user and for possible peers of the user;

comparing energy usage data for each peer group member with energy usage data for the user and computing a comparison result between each peer group member and the user; and providing a representation of the comparison results to the user, wherein the geographic information and building occupancy information is formatted as one or more feature vectors, wherein the identification of the peer group comprises comparing of feature vectors of possible peers with feature vectors for the user, and wherein the comparison of the feature vectors comprises:

computing a geographic distance $d_g$ between the user and the possible peer;

computing an occupancy distance $d_o$ between the user and the possible peer; and computing an overall distance d between the user and the possible peer, where d is a function of $d_g$ and $d_o$.

2. The method of claim 1, wherein the geographic information comprises:

location information; and climate information.

3. The method of claim 1, wherein the building occupancy information comprises a likelihood that a person is present in a building at each of a plurality of time intervals during a day.

4. The method of claim 1, wherein the geographic distance $d_g$ is computed $$d_g(x,y)=\text{haversine}(x_1,y_1)+\alpha\|x_c-y_c\| \text{ for the user } x \text{ and a possible peer } y,$$

where $x_1$ and $y_1$ represent locations of the user x and the possible peer y respectively, $x_c$ and $y_c$ are feature vectors representing climate information for the user and the peer group member respectively, and $\alpha$ is a climate information weighting factor.

5. The method of claim 1, wherein the occupancy distance $d_o$ is computed $$d_o(x,y)=\langle x_o,y_o\rangle/\|x_o\|^2\|y_o\|^2 \text{ for the user } x \text{ and a possible peer } y,$$

where $x_o$ and $y_o$ are feature vectors representing the likelihood of occupancy in each of several time intervals by the user x in a building associated with user x, and by a possible peer y in a building associated with possible peer y, respectively, $\|\ \|$ is a norm calculation, and $\langle\ \rangle$ is a dot product calculation.

6. The method of claim 1, wherein the computing of the overall distance d comprises computing $d(x, y)=d_g+\beta d_o$, where $\beta$ is an occupancy distance weighting factor.

7. The method of claim 6, wherein the peer group comprises possible peers whose respective overall distances from the user are less than a predefined threshold distance.

8. The method of claim 6, wherein the peer group comprises a predefined number of possible peers having the shortest overall distances from the user, of the possible peers.

9. A system, comprising:

a programmable processor; and a memory in communication with the processor, the memory storing instructions which, when executed by the processor, cause the processor to:

identify a peer group of a user on the basis of geographic information and building occupancy information of the user and of possible peers of the user;

compare energy usage data for each peer group member with energy usage data for the user and computing a comparison result between each peer group member and the user; and provide a representation of the comparison results to the user;

wherein the geographic information and building occupancy information is formatted as one or more feature vectors, and wherein the instructions which cause the processor to identify the peer group cause the processor to compare feature vectors of possible peers with feature vectors for the user, wherein the comparison of the feature vectors comprises:

computing a geographic distance $d_g$ between the user and the possible peer;

computing an occupancy distance $d_o$ between the user and the possible peer; and computing an overall distance d between the user and the possible peer, where d is a function of $d_g$ and $d_o$.

10. The system of claim 9, wherein the geographic information comprises:

location information; and climate information.

11. The system of claim 9, wherein the building occupancy information comprises likelihood that a person is present in a building at each of a plurality of time intervals during a day.

12. The system of claim 9, wherein the geographic distance $d_g$ is computed $$d_g(x,y)=\text{haversine}(x_1,y_1)+\alpha\|x_c-y_c\| \text{ for the user } x \text{ and a possible peer } y,$$

where $x_1$ and $y_1$ represent locations of the user x and a possible peer y respectively, $x_c$ and $y_c$ are feature vectors representing climate information for the user and the possible peer respectively, and $\alpha$ is a climate information weighting factor.

13. The system of claim 9, wherein the occupancy distance $d_o$ is computed $$d_o(x,y)=\langle x_o,y_o\rangle/\|x_o\|^2\|y_o\|^2 \text{ for the user } x \text{ and a possible peer } y,$$

where $x_o$ and $y_o$ are feature vectors representing the likelihood of occupancy in each of several time intervals by the user x in a building associated with user x, and by a possible peer y in a building associated with peer group member y, respectively, $\|\ \|$ is a norm calculation, and $\langle\ \rangle$ is a dot product calculation.

14. The system of claim 9, wherein the computing of the overall distance d comprises computing $d(x, y)=d_g+\beta d_o$, where $\beta$ is an occupancy distance weighting factor.

15. The system of claim 14, wherein the peer group comprises possible peers whose respective overall distances from the user are less than a predefined threshold distance.

16. The system of claim 14, wherein the peer group comprises a predefined number of possible peers having the shortest overall distances from the user, of the possible peers.

* * * * *